US005831402A

United States Patent [19]

Yang

[11] Patent Number: 5,831,402

[45] Date of Patent: Nov. 3, 1998

[54] DOUBLE DIRECTION ACTUATING TYPE TOOL OF LOOSE FORWARD AND LOOSE BACKWARD ASSISTING STYLE

[76] Inventor: Tai-Her Yang, No. 32 Lane 29, Taipin St., Si-Hu Town, Dzan-Hwa, Taiwan

[21] Appl. No.: 617,653

[22] Filed: Mar. 15, 1996

[51] Int. Cl.[6] ........ H02P 1/00

[52] U.S. Cl. ........ 318/281; 318/139; 318/434; 173/176

[58] Field of Search ........ 318/280–300, 318/139, 432, 434; 173/2, 176, 180, 213, 217

[56] References Cited

U.S. PATENT DOCUMENTS

| | | | |
|---|---|---|---|
| Re. 31,569 | 5/1984 | Eshghy | 29/407 |
| 3,596,718 | 8/1971 | Fish et al. | 173/12 |
| 4,066,133 | 1/1978 | Voss | 173/12 |
| 4,953,053 | 8/1990 | Pratt | 361/31 |
| 4,967,308 | 10/1990 | Morse | 361/42 |
| 5,361,852 | 11/1994 | Inoue et al. | 173/176 |

*Primary Examiner*—David S. Martin
*Attorney, Agent, or Firm*—Bacon & Thomas, PLLC

[57] ABSTRACT

A bi-directionally actuated hand tool provides a power assist during loose forward and loose backward (low torque) operation. The subject tool can be used in conventional mechanisms such as a sleeving spanner, gear wrench, mobile wrench, screwdriver, hoist, power puller, or crane, using only a light torque auxiliary motor drive, power cells, and relevant operation switches to provide a power assist for the purpose of speeding-up low torque operations while permitting manually application of high torques. The operation switches of the auxiliary drive may be synchronized with the switch that normally controls tool direction, and the value of the torque output by the auxiliary motor drive can be limited by either a mechanical or electrical torque detector to cut-off automatically whenever the torque is exceeded.

6 Claims, 1 Drawing Sheet

DOUBLE DIRECTION ACTUATING TYPE TOOL OF LOOSE FORWARD AND LOOSE BACKWARD ASSISTING STYLE

SUMMARY OF THE INVENTION

Conventionally, operation of a bi-directionally actuated hand tool is carried out by: 1.) applying heavy torque for initially releasing a work piece and light torque for further loosening it; and 2.) applying light torque for loose advancing of the workpiece and heavy torque for tightening. The problem with this procedure is that, in the course of the bi-directional operation, the application of light torque consumes an excessive amount of time. To solve this problem, the subject bi-directionally actuated hand tool provides a power assist during loose forward and loose backward (low torque) operation. The subject tool can be used in conventional mechanisms such as a sleeving spanner, gear wrench, mobile wrench, screwdriver, hoist, power puller, or crane, using only a light torque auxiliary motor drive, power cells, and relevant operation switches to realize some or all of the following functions:

- Rotational power derived from the auxiliary motor drive provides the loose forward and loose backward functions as well as adjustment at light torques;
- Manual operation provides the heavy torques required to release a workpiece;
- Actuation of the operation switches is synchronized with the double direction actuating control of the hand tool;
- The term "light torque" is defined as the torque produced by the auxiliary motor drive, including that induced by the transmission elements which is inferior to the torque required for the release or compression of the workpiece;
- The value of the light torque output by the auxiliary motor drive is such that it can be set by mechanical means so that once the preset torque is exceeded, or such that when it is detected and found to be at a relative current value as determined by a power sensor type overtorque detector, power supply to the auxiliary motor drive will be cut off automatically; and
- Low torque transmission output from the auxiliary motor drive may be set or converted to provide a discrete, non-continuous (stepped or fine) advanced.

DETAILED DESCRIPTION OF THE PREFERRED EMBODIMENTS

The subject bi-directionally actuated hand tool having a loose forward and loose backward power assist function may be used in a sleeving spanner, gear wrench, mobile wrench, screwdriver, hoist, power puller, crane, all of which are double direction actuating type hand tools having some or all of the following characteristic features:

1. The tools are operable in a forward as well as a reverse direction for actuation;
2. Actuation in the forward direction begins with a low torque with the final compression provided by a high torque;
3. Actuation in the reverse direction is initiated with a high torque and loosening is consummated with a low torque;
4. Linear displacement or angular displacement adjustment is executed with low torque application;
5. Both forward actuation and reverse actuation is carried out by means of assemblies capable of double direction maneuvering including: ratchet handles for control of the direction of actuation of a sleeving spanner; a ratchet handle for control of the direction of actuation of the ratchet spanner, a thumb-actuated helical structure for adjustment of the mobile wrench; a ratchet thumb grip for control of the rotational direction of the screwdriver; or an irreversible transmission such as a worm gear set capable of both forward and reverse actuation, and with the strength to withstand manual tightening or releasing of the hand tool; or else the incorporation of a lock structure capable of manually applied compression or release of the tool and provided in the drive train between the auxiliary transmission motor and the tool output shaft.

Figure 1:
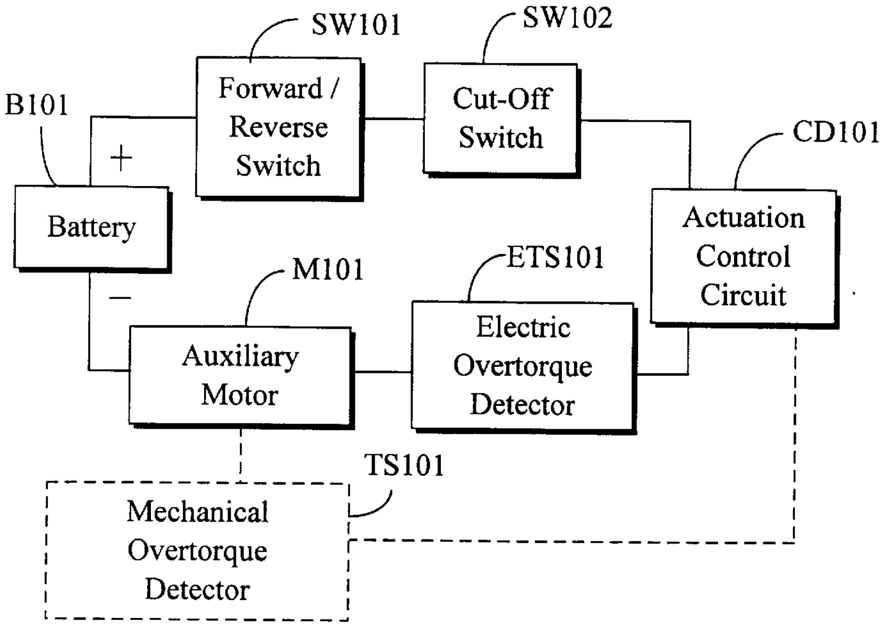
FIG. 1 is a block diagram of the circuitry of the fundamental structure of the invention.

FIG. 1 is a schematic of the circuitry employed by the fundamental structure of the invention, including a unique reciprocating system made up of the above-mentioned basic structure, power cell sets, auxiliary motor drive and control switches, with the auxiliary power section incorporating:

- a battery cell B101, which can be either a rechargeable secondary cell or a primary cell, for supplying power to the auxiliary transmission motor M101;
- an auxiliary transmission motor M101, which can be either an A.C., D.C., brushless or brushed, synchronous or a synchronous motor, for driving the bi-directionally actuated tool to assist its normal driving means;
- a control switch made up of a forward reverse rotating direction control switch SW101, which can be an ELECTRO-mechanical or solid state switch, and a cutoff switch SW102, which can be separate or integrated with switch SW101, to control the auxiliary motor for forward running, reverse running or stopping, direction control switch SW101 being operated by a linkage to a ratchet thumb handle for control of the direction of actuation of the tool for concerted control or, alternatively, can be independently structured for independent control;
- an actuation control circuit CD101 made up of electromechanical or solid state elements, to control forward/reverse rotation of the auxiliary motor drive and its torque limits to a degree less than the torque required for the actuation of heavily charged objects, but greater than the actuation torque in low load conditions, and which, once the preset torque is exceeded, cuts power automatically through a mechanical overtorque slide contact detector switch TS101, or alternatively by detecting overcurrent conditions resulting when current from the overtorque is generated by the auxiliary motor and detected by an electric sensing type overtorque is generated by the auxiliary motor and detected by an electric sensing type overtorque detector ETS101 situated between the source of power and the load side of the auxiliary motor drive transmission system, so that the power is automatically cut once a preset negative torque on the auxiliary motor drive M101 is exceeded, the power-out condition being relieved automatically when the control switch turns to condition OFF or reverts to a reverse position, or after a preset delay, at which time the actuating control circuit CD101 reverts anew to a ready-to-supply-power status.

The basic structure and transmission system disclosed above serves to provide a low-torque loose forward or backward actuation or adjustment with respect to a workpiece, with high-torque release or compression with respect to same being supplied by manually applied heavy torque.

Figure 2:
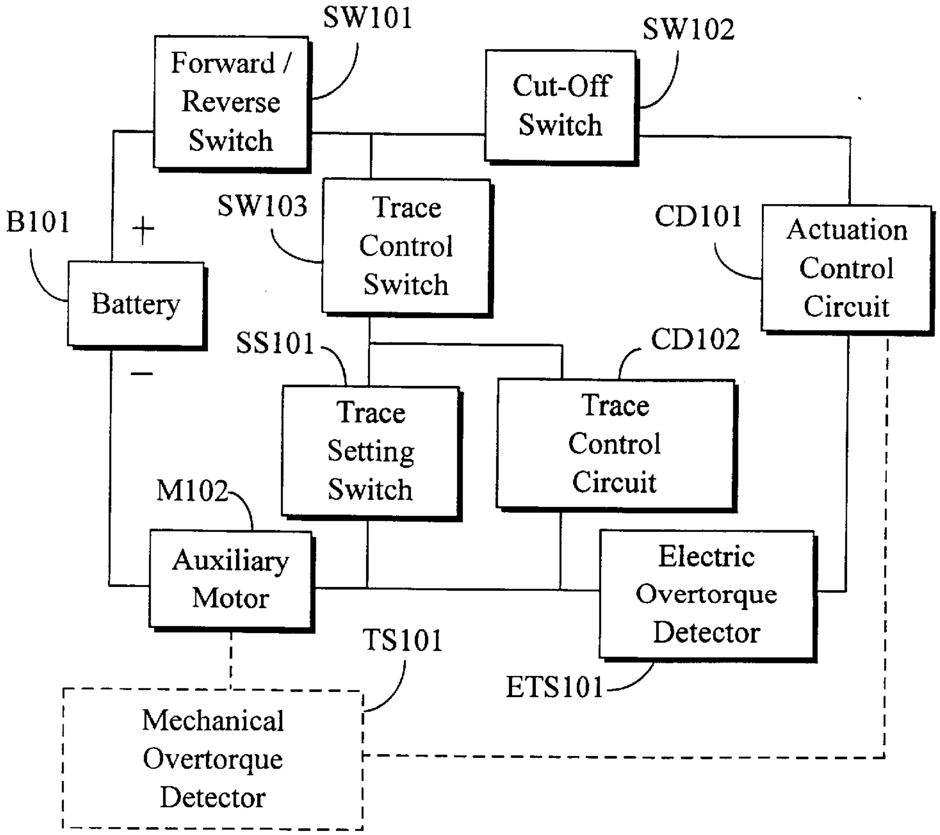
FIG. 2 is a block diagram of the programmable or discrete, non-continuous trace advance adjustment function, according to a preferred embodiment the invention.

In addition to such functions as recited in the foregoing, the subject tool can further be adapted to perform programmable or non-continuous discrete trace advance adjusting operations, as illustrated in FIG. 2, by providing in addition to the above-mentioned battery cell control switch and actuation control circuit, the following elements:

an auxiliary motor drive M102, which can be an A.C., or D.C., brushed or brushless, synchronous or servo or stopper motor, and which is capable of either forward or backward actuation, torque restriction, and quantified or trace step advance adjustment actuation;

a trace transmission control switch SW103 capable of manual operation to produce a quantified or trace step signal and electric energy commensurate therewith, so as to control auxiliary actuation motor M102 for quantified or trace step transmissions;

a trace transmission setting switch SS101 composed of electro-mechanical or solid-state components to provide quantified or trace step advances, but which may be omitted where an open type of operation is employed;

a quantified or trace step advance transmission control circuit CD102 composed of electro-mechanical or solid-state elements and which, in addition to providing automatic power cutoff of auxiliary motor drive during forward, reverse rotation, and torque restrictions, accepts control by the trace transmission setting switch SS101 so as to feed quantified angular displacements to the auxiliary motor drive, or angular displacement presets for trace advance rate or actuation of same.

The subject tool derives its control means from: (1) manual direction control of the two-directional actuation; (2) direction control switch SW101 for the auxiliary motor drive; (3) control switch SW102 for manual startup and stoppage of the auxiliary motor drive; (4) an overcurrent detector synchronous with the control circuit of the auxiliary motor drive CD101; (5) a sensor type overtorque detector ETS101, electrically actuated, for detection of the output torque of the auxiliary motor drive; (6) the mechanical overtorque sliding contact detection switch TS101; (7) a mechanical structure overtorque continuous slide mechanisms; (8)trace transmission control switch SW103; 99) trace transmission setting device SS101; and (10) quantified or trace step advance control circuit CD102.

Of the control means described in the foregoing, (1) through (3) relate to overtorque detection control of the manually driven direction of transmission of the subject tool and of the steering direction of the auxiliary motor drive; (4) through (7) relate to torque control, either electrically or mechanically actuated, to detect mechanically transmitted overtorque; and (8) through (10) relate to the trace transmission control device.

Depending on the manner in which the tool is employed during manual operations, each of the control means (1) through (10) enumerated above can be independently or integrally installed and arranged such that:

a. The direction control of the two-directional actuation tool (1) and the direction control switch for the auxiliary motor drive (2) are operated independent of each other or synchronously for integrated or interactive execution;

b. The direction control switch for the auxiliary motor drive (2) and the manually actuated startup and stop control switch for the auxiliary motor drive (3) are operated independent of each other by structural design or else operated individually on a common structural embodiment;

c. Item (2) and Item (3) can be based on an integrated electro-mechanical structure capable of forward rotation-stop-reverse rotation modes of operations;

d. Item (2) and Item (3) can be integrated together in a structural body capable of forward, reverse actuation, and by depression actuation of the auxiliary motor drive, with the motor drive being rendered inoperative by a loosening relief;

e. Items (1), (2), and (3) can be integrated structurally so that item (1) and item (2) are capable of synchronous in operation, whereas item (2) and item (3) are related to each other by the incorporation of electro-mechanical switches built on a common structure;

f. One of items (4), (5), (6) can be included so that the auxiliary motor drive is rendered inoperative when an overtorque develops;

g. Should an idle running occur due to overtorque once item (7) is put into effect, the auxiliary motor drive can be stopped by manual intervention;

h. Item (8) may be provided independently;

i. Item (8) and item (2) can be built on a common switching mechanism;

j. Item (9) may be introduced contingent on needs;

k. Other combinations of layouts or arrangements are possible to fit specific needs;

In summation, the subject tool, with its built-in auxiliary motor drive and battery cell, related operation switches and control circuits makes possible loose forward and loose backward actuation of torque in lieu of the conventional practice which involves time-and-labor consuming loose forward, loose backward manipulation, in such contexts as hoist, power puller, or crane empty load journeys, screwdriver low load angular displacement adjustment (variable potentionmeter, for example), or tension-reliant adjustment of springs, so that with the subject tool, a low cost, loose forward, loose backward actuation is made possible with substantial savings in both time and energy compared to conventional tools, eliminating the need for capacity motor, high rating battery cells once and for all without sacrificing any performance features whatsoever.

I claim:

1. Apparatus, comprising:

a bi-directional hand tool operable in a forward direction and a reverse direction, at high and low torques;

means including an auxiliary motor for providing a power assist during manual operation of said hand tool in both said forward and reverse directions, but only at low torques, said motor being arranged to shut-off during manual operation of the tool at high torques so that high torque operation of the hand tool is carried out without a power assist;

means including a battery for providing power to said motor;

forward/reverse switch means for switching between operation of said hand tool in said forward and reverse directions, and means for causing said motor to operate in said forward and reverse directions depending on a status of said forward/reverse switch means; and torque detection means for detecting a torque on said motor and for automatically cutting-off said power to said motor when said torque exceeds a low torque limit.

2. Apparatus as claimed in claim 1, wherein said torque detection means comprises a detector selected from the group consisting of a mechanical slide contact detector switch, an overcurrent detector, and an induction type over-torque detector installed between the power supply and load of the auxiliary motor.

3. Apparatus as claimed in claim 1, further comprising start-up means for automatically re-starting the supply of power to said auxiliary motor following cut-off, said start-up means being responsive to movement of a control switch to an off position, operation of said forward/reverse switch means, or elapsing of a predetermined time period.

4. Apparatus as claimed in claim 1, wherein high torque operation of said hand tool is carried out manually.

5. Apparatus as claimed in claim 1, further comprising means for controlling said auxiliary motor to execute tracing or fine positioning operations at said low torques.

6. Apparatus as claimed in claim 1, wherein said hand tool is selected from the group consisting of a screw driver, spanner wrench, gear wrench, mobile wrench, hoist, power puller, and crane.

* * * * *